US011833945B1

(12) United States Patent
Ubale

(10) Patent No.: US 11,833,945 B1
(45) Date of Patent: Dec. 5, 2023

(54) SPACER PANEL FOR VEHICLE SEAT

(71) Applicant: FAURECIA AUTOMOTIVE SEATING, LLC, Auburn Hills, MI (US)

(72) Inventor: Sachin Ubale, Troy, MI (US)

(73) Assignee: Faurecia Automotive Seating, LLC, Auburn Hills, MI (US)

(*) Notice: Subject to any disclaimer, the term of this patent is extended or adjusted under 35 U.S.C. 154(b) by 0 days.

(21) Appl. No.: 17/745,055

(22) Filed: May 16, 2022

(51) Int. Cl.
B60N 2/60 (2006.01)
(52) U.S. Cl.
CPC .................. B60N 2/6009 (2013.01)
(58) Field of Classification Search
CPC ................ B60N 2/6009; A47C 7/66
USPC ..................................... 297/184.11
See application file for complete search history.

(56) References Cited

U.S. PATENT DOCUMENTS

| | | | | |
|---|---|---|---|---|
| 4,443,034 A | * | 4/1984 | Beggs | B60N 2/3011 296/37.16 |
| 4,979,772 A | * | 12/1990 | Carey | B60N 2/3011 296/97.23 |
| 6,536,843 B1 | * | 3/2003 | Severinski | B60N 2/36 297/378.12 |
| 7,159,922 B2 | * | 1/2007 | Iyoda | B60N 2/309 296/66 |
| 8,196,990 B2 | * | 6/2012 | Aebker | B60N 2/36 296/69 |
| 8,398,164 B2 | * | 3/2013 | Baker | B60N 2/3011 297/188.1 |
| 9,050,913 B2 | * | 6/2015 | Thota | B60R 5/04 |
| 10,369,910 B1 | | 8/2019 | Atragene et al. | |
| 2004/0041431 A1 | * | 3/2004 | Ito | B60N 2/36 296/65.05 |
| 2009/0108639 A1 | * | 4/2009 | Sturt | B60N 2/36 297/15 |
| 2009/0115236 A1 | * | 5/2009 | Sturt | B60N 2/3011 297/354.1 |
| 2013/0328341 A1 | | 12/2013 | Maguire et al. | |
| 2015/0130221 A1 | * | 5/2015 | Preisler | B60N 2/6009 296/193.07 |

FOREIGN PATENT DOCUMENTS

| | | |
|---|---|---|
| CN | 207225144 U | 4/2018 |
| EP | 1919732 A1 | 5/2008 |
| EP | 2661985 A1 | 11/2013 |

* cited by examiner

Primary Examiner — Mark R Wendell
(74) Attorney, Agent, or Firm — BARNES & THORNBURG LLP

(57) ABSTRACT

A spacer panel for a rear side of a seat backrest of a vehicle includes a support structure having a first end and a second end with a tapered section extending from a first portion of the support structure to the first end of the support structure. The support structure is configured to be attached to the rear side of the backrest of the seat. The spacer panel has a honeycomb plastic structure with a thickness varying along a length of the support structure from the first end to the second end of the support structure. A gap hider is associated with the seat such that when the seat is folded, an outer surface of the spacer panel and an upper surface of the loading floor of the vehicle remains in line and oriented at the same angle forming an extended load floor and also providing support to the gap hider.

18 Claims, 4 Drawing Sheets

SPACER PANEL FOR VEHICLE SEAT

TECHNICAL FIELD

The present disclosure relates to the field of vehicle seats. More particularly the present disclosure relates to a spacer panel adapted to be configured with a rear side of rear seats of the vehicle for improving the functionality of the rear side when the rear seats are folded.

BACKGROUND

Background description includes information that may be useful in understanding the present disclosure. It is not an admission that any of the information provided herein is prior art or relevant to the subject disclosure, or that any publication specifically or implicitly referenced is prior art.

Conventionally, rear seats of vehicles are foldable to provide liberty to a user to fold rear seats when they are not in use. A backrest of the seat remains movably coupled to a seat cushion of the seat, such that the backrest may be pushed down towards the seat cushion in a loading position, and the backrest may be extended away from the seat cushion in a seating position. The user can increase or extend the storage space or loading area of the vehicle by moving the backrest to the loading position. Usually, the loading area (or the fixed trunk area) is leveled and the are no irregularities in the area in terms of the level or surface. When the rear seat is folded in the loading position, a gap is created between the backrest and the loading area. FIG. 1 shows a seat 100 having a backrest 102 movably coupled to a seat cushion with a cushioned part 104. As illustrated in FIG. 1, a gap hider 106 is configured to cover any gap 108 between the loading area and the backrest 102. Further, a carpet is generally provided over the folded seat 100 to cover the backrest 102. Since the gap hider 106 just lies on the top of the carpet, an upper level of an extended load floor does not remain in line with the level of the carpet or the backrest 102 as there is no guide for the gap hider 106 to fit in. As a result, the overall level of the extended loading floor area gets compromised. Also, as the gap hider 106 lies over the gap 108 between the seat 100 or the backrest 102 (when the seat is folded), there is no support present under the gap hider 106 and there is a high probability of damaging the gap hider 106 in case a heavy load is kept on the gap hider 106. Additionally, there are chances of obstruction between the carpet with the gap hider 106.

SUMMARY

The subject disclosure overcomes the above-mentioned drawbacks, limitations, and shortcomings associated with existing seats and loading area of a vehicle, and provides a simple and cost-effective arrangement for the rear side of the seats of a vehicle so that when the rear seat is folded, the overall level of the extended floor loading area of the vehicle is not compromised and the gap hider is protected from getting damaged by heavy loads.

The present disclosure relates to the field of vehicle seats and provides a simple, light-weight, and cost-effective spacer panel for vehicles, which is adapted to be configured with the rear side of the rear seats of the vehicle for improving the functionality and aesthetics of the rear side and floor area of the vehicle when the rear seats are folded.

An aspect of the present disclosure pertains to a spacer panel adapted to be configured with a rear side of a rear seat backrest of a vehicle. The spacer panel includes a honeycomb plastic support structure having a first end and a second end with a tapered section extending from a first portion of the support structure to the first end of the support structure. An inner surface of the support structure is configured to be attached to a rear side frame of the backrest of the seat. Further, a thickness of the support structure at the first portion is more than the thickness of the support structure at the second end, with the thickness of the support structure linearly reducing from the first portion up to the second end. The outer surface of the spacer panel is further adapted to allow attachment of a carpet or trim panels thereon. Accordingly, when the seat is folded, an outer surface (upper level) of the spacer panel/carpet and an upper level of the loading floor or gap hider of the vehicle remain in line and are oriented at the same angle, thereby forming a seamless extended load floor in the vehicle.

In an aspect, the first end of the support structure or tapered section may be configured with a pivotal end of the backrest. Further, a portion of the spacer panel between the first portion and the tapered section has a curved profile (also referred to as a guiding curve), which restricts obstruction between the gap hider and the carpet. A profile of the tapered section may be identical or correspond to an inner profile of a gap hider configured with a load floor of the vehicle, such that at least a portion of the tapered section is flush with and fits inside a gap between the gap hider and the backrest to provide support to the gap hider and also provide a guide to open and close the gap hider. As a result, when the seat is folded, the upper levels of the carpet and the upper surface of the gap hider associated with the seat remain in line and oriented at the same angle, thereby forming the seamless extended load floor and also providing support to the gap hider.

Thus, the proposed spacer panel provides support to the gap hider, avoids any obstructions between the gap hider and the carpet, provides a seamless extended load floor, and also protects the seat and gap hider from damages due to load when the seat is folded. Additionally, the use of a plastic honeycomb structure saves material, thereby making the spacer panel lightweight and cost-effective, and also allowing the spacer panel to have a thickness between 2-15 mm (but not limited to the like), thereby meeting the load floor flatness, which is not possible or feasible with other materials and designs.

Various objects, features, aspects, and advantages of the disclosed subject matter will become more apparent from the following detailed description of preferred embodiments, along with the accompanying drawing figures in which like numerals represent like components.

BRIEF DESCRIPTION OF DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure.

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
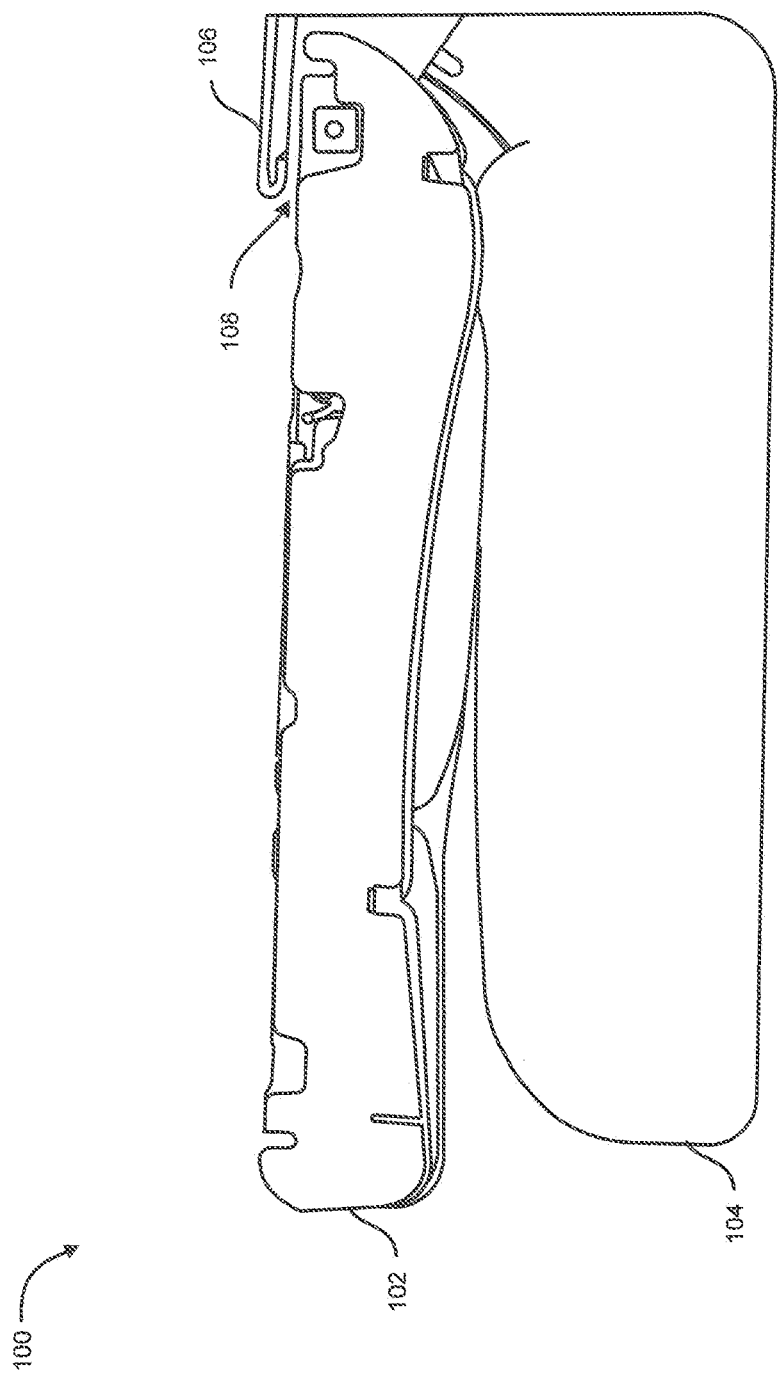
FIG. 1 illustrates an exemplary representation of a folded conventional rear seat.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the scope of the present disclosure as defined by the appended claims.

Various terms are used herein. To the extent a term used in a claim is not defined below, it should be given the broadest definition persons in the pertinent art have given that term as reflected in printed publications and issued patents at the time of filing.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the disclosure and does not pose a limitation on the scope of the disclosure otherwise claimed. No language in the specification should be construed as indicating any non-claimed element essential to the practice of the disclosed subject matter.

Groupings of alternative elements or embodiments of the subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

In the specification, reference may be made to the spatial relationships between various components and to the spatial orientation of various aspects of components as the devices are depicted in the attached drawings. However, as will be recognized by those skilled in the art after a complete reading of the present application, the devices, members, devices, etc. described herein may be positioned in any desired orientation. Thus, the use of terms such as "above," "below," "upper," "lower," "first", "second" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The present disclosure relates to the field of vehicle seats. More particularly the present disclosure relates to a simple, light-weight, and cost-effective spacer panel for vehicles, which is adapted to be configured with the rear side of the rear seats of the vehicle for improving the functionality and aesthetics of the rear side and floor area of the vehicle when the rear seats are folded.

The present disclosure elaborates upon a spacer panel adapted to be configured with a rear side of a seat backrest of a vehicle. The spacer panel includes a support structure having a first end and a second end with a tapered section between a first portion to the first end of the support structure. The support structure may be configured to be attached to a rear side of a backrest of a seat of the vehicle. Further, the thickness of the support structure may vary from the first portion to the second end of the support structure, such that when the seat is folded, an outer surface of the support panel and the floor of the vehicle forms a seamless extended load floor.

In an embodiment, when the seat is folded, the outer surface of the support panel and the floor of the vehicle may come in line and be oriented at the same angle forming the seamless extended load floor.

In an embodiment, the support structure has a honeycomb structure.

In an embodiment, the spacer panel may be made of plastic.

In an embodiment, the first end of the support structure may be configured with a pivotal end of the backrest of the seat.

In an embodiment, the spacer panel may be attached to the rear side of the backrest by an inner surface of the support structure.

In an embodiment, the spacer panel may comprise a set of engaging elements configured to facilitate attachment of the spacer panel to a frame of the backrest of the seat.

In an embodiment, the thickness of the support structure at the first portion may be greater than the thickness of the support structure at the second end, with the thickness of the support structure linearly reducing from the first portion up to the second end.

In an embodiment, the outer surface of the spacer panel may be adapted to attach a carpet thereon such that when the seat is folded, no gap is present between the backrest and the carpet.

In an embodiment, when the seat is folded, the carpet and an outer surface of a gap hider associated with the seat may come in line and be oriented at the same angle.

In an embodiment, when the seat is folded, the carpet and floor of the vehicle may come in line and be oriented at the same angle forming the seamless extended load floor.

In an embodiment, a portion of the spacer panel may have a curved profile between the first portion and the tapered section, which restricts obstruction between the gap hider and the carpet.

In an embodiment, the tapered section is configured with the gap hider such that a guide may be provided to open and close the gap hider.

In an embodiment, at least a portion of the tapered section may flush and fit inside a gap between the gap hider and the backrest to provide support to the gap hider.

In an embodiment, a profile of the tapered section may correspond to an inner profile of the gap hider.

In an embodiment, the outer surface of the spacer panel may comprise a set of trim channels adapted to secure one or more trim panels thereon.

In an embodiment, the thickness of the tapered section may reduce from the first portion to the first end of the support structure.

In an embodiment, the thickness of the tapered section may reduce parabolically from the first portion towards the first end of the support structure such that a curved profile is formed at the first portion and a tapered flat profile is formed at the first end of the spacer panel.

In an embodiment, the spacer panel may be configured with the rear side of the backrest of any or a combination of a rear seat and a front non-driver seat of the vehicle.

In another aspect, the present disclosure elaborates upon an automotive seat comprising a seat cushion, a backrest foldably coupled to the seat cushion, and the spacer panel attached to the rear side of the backrest.

Figure 2A:
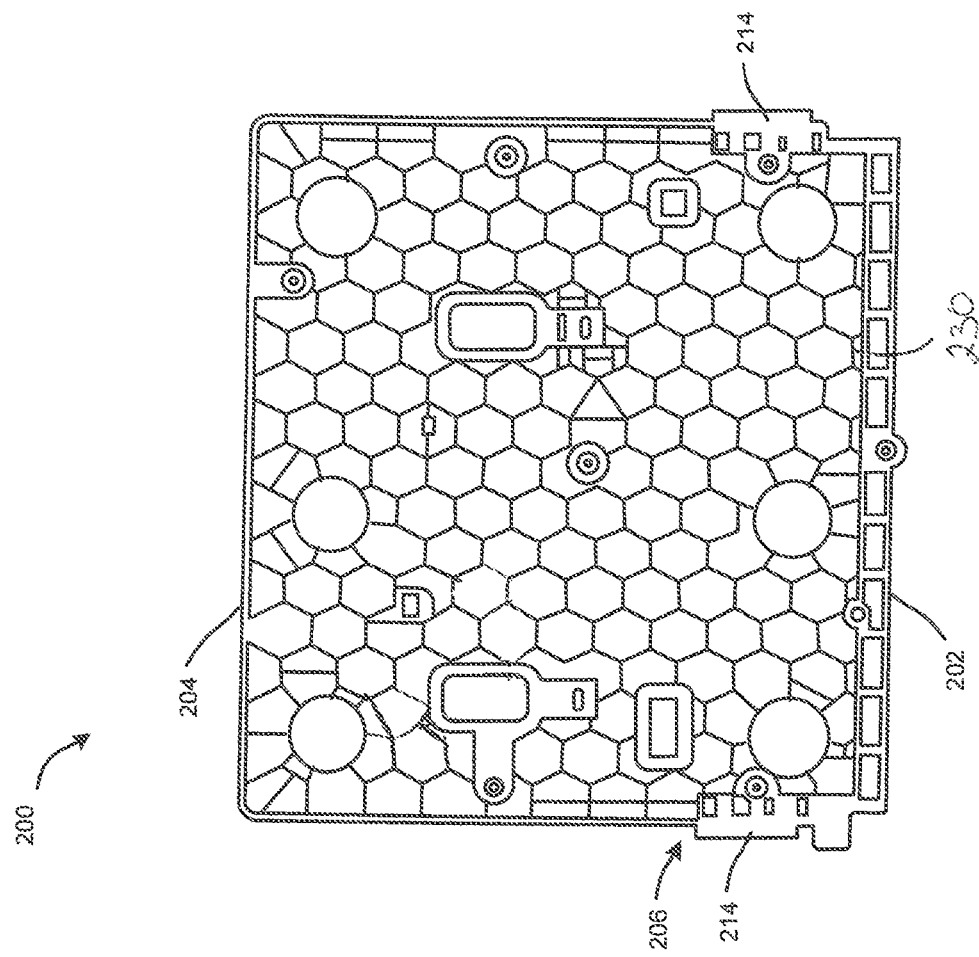
FIG. 2A illustrates an exemplary top view representation of the proposed spacer panel, in accordance with an embodiment of the present disclosure.
Figure 2B:
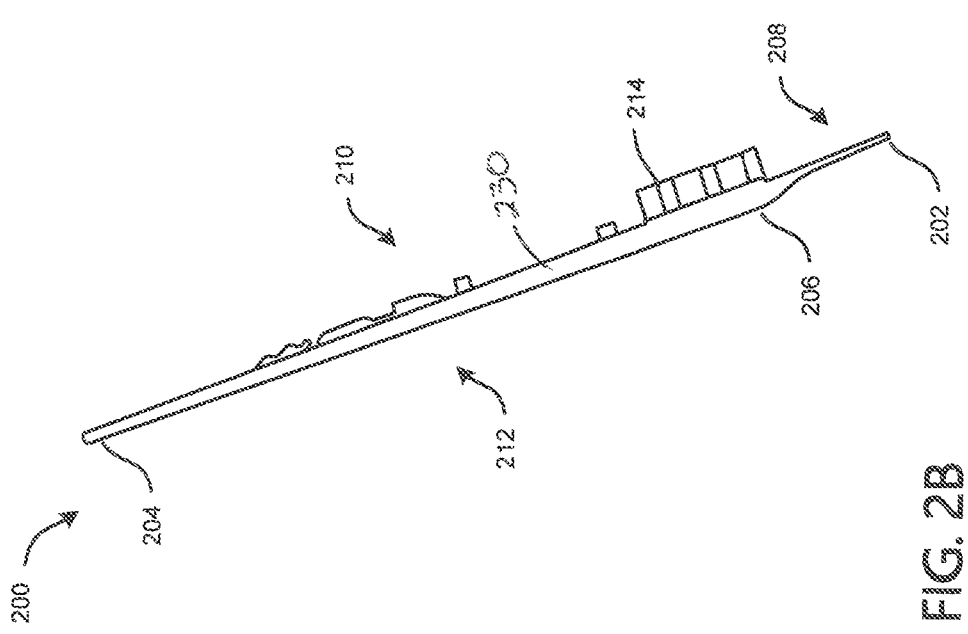
FIG. 2B illustrates a section view of the proposed spacer panel of FIG. 2A.
Figure 3A:
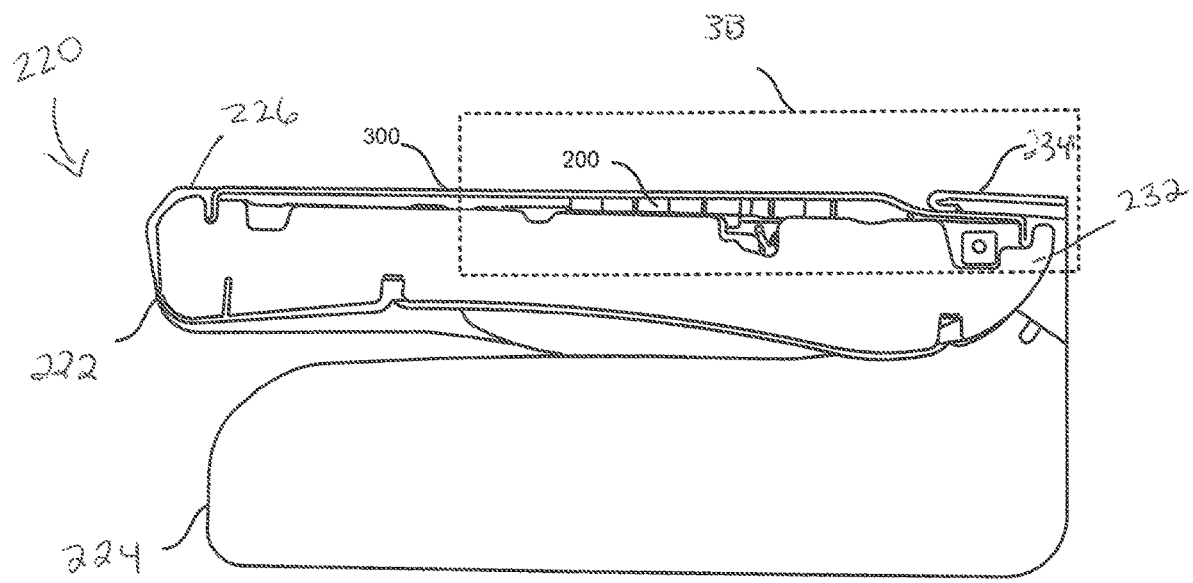
FIG. 3A illustrates an exemplary representation depicting the configuring of the spacer panel with the backrest, in accordance with an embodiment of the present disclosure.
Figure 3B:
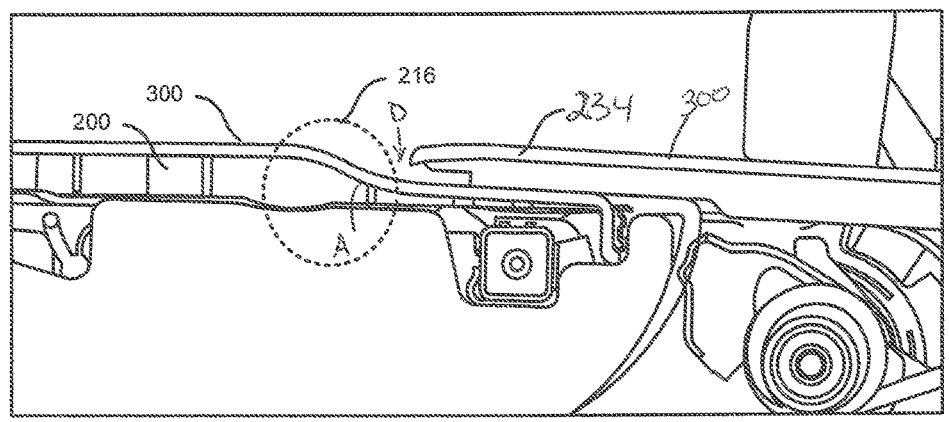
FIG. 3B illustrates an exemplary representation of a magnified view of the detail identified in FIG. 3A.

FIGS. 2A-B illustrate an exemplary representation of a proposed spacer panel 200, in accordance with an embodiment of the present disclosure. FIGS. 3A-B illustrate an exemplary representation of a seat 220 having a backrest 222, which incorporates the spacer panel 200, and a seat cushion with a cushioned part 224.

As illustrated in FIGS. 3A-B, the spacer panel 200 is adapted to be configured with a rear side 226 of the backrest 222 of the seat 220 of a vehicle. In an embodiment, the spacer panel 200 can be attached to the rear side 226 of the backrest 222 of a rear seat and/or a front non-driving seat of the vehicle. The spacer panel 200 can include a support structure 230 having a first end 202 and a second end 204 with a tapered section 208 between a first portion 206 (near the first end 202) and the first end 202 of the support structure 230. The spacer panel 200 can have a honeycomb-designed structure that can be made of a material selected from plastic, fiber, but not limited to the like. The first end 202 of the support structure 230 can be associated with a pivotal end 232 of the backrest 222. The pivotal end 232 of the backrest 222 can correspond to an end that is pivotally coupled to the cushioned horizontal part 224 of the seat 220 where a user is supposed to sit. The backrest 222 can be pushed down towards the cushioned part 224 of the seat 220 in a loading position, and the backrest 222 can be extended/pulled away from the cushioned part 224 in a seating position The thickness of the spacer panel 200 can vary along a length of the support structure 230 from the first end 202 to the second end 204. In one example, the thickness varies from the first portion 206 near the first end 202 up to the second end 204 of the support structure 230, with the tapered section 208 extending from the first portion 206 to the first end 202. In an embodiment, the thickness of the support structure 230 at the first portion 206 can be greater than the thickness at the second end 204, and the thickness can linearly reduce or continuously decrease from the first portion 206 to the second end 204. The first portion 206 can be at a first distance from the first end 202. The first distance or length of the tapered section 208 can be equal to or greater than a length of a portion of a gap hider 234 associated with the seat 220, which is supposed to overlap the support structure 230.

Figure 4:
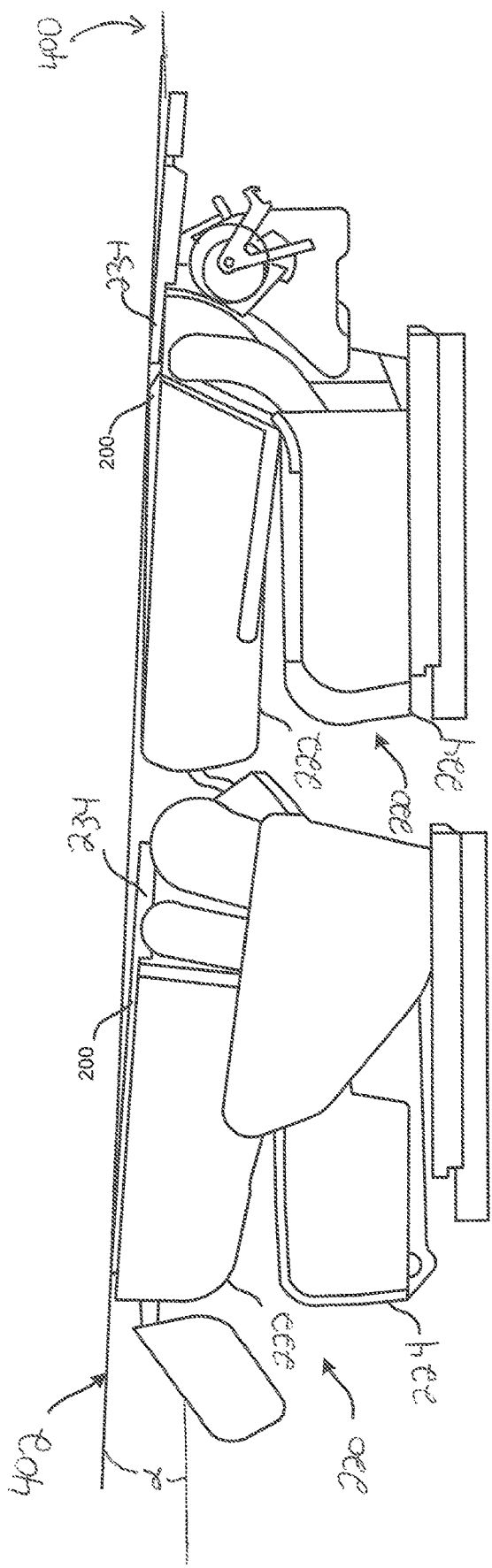
FIG. 4 illustrates an exemplary representation depicting the load floor angle achieved by the backrest after incorporating the spacer panel, in accordance with an embodiment of the present disclosure.

In an embodiment, the gap hider 234 can correspond to a member that can be associated with a load floor 400 (shown schematically in FIG. 4 and also referred to as floor, herein) of a vehicle to hide a gap 236 between an extended load floor area 402 provided by the folded backrests 222 and the pivotal end 232 of the backrest 222. When the backrests 222 are folded, as shown in FIG. 4, an outer surface of the gap hider 234 generally aligns with the an outer surface of the folded backrests 222 such that they are generally co-planar with each other. This provides a generally flat and uninterrupted extended load floor area 402.

The support structure 230 can include an inner surface 210 and an outer surface 212 as shown in FIG. 2B. The support structure 230 can be configured with the rear side 226 of the rear seat backrest 222 via the inner surface 210. The support structure 230 can include the tapered section 208 which extends from the first portion 206 to the first end 202. Further, the spacer panel 200 can include a set of engaging elements 214 configured to facilitate attachment of the spacer panel 200 to a frame of the backrest 222 of the seat 100. In one example, the engaging elements 214 comprise discrete areas on the support structure 230 that provide increased thickness areas compared to other areas of the support structure 230. These increased thickness areas provide for increased rigidity and strength at attachment interfaces between the frame and the spacer panel 200.

Furthermore, a profile of the tapered section 208 can correspond to an inner profile of the gap hider 234. For instance, a depth "D" and an arc "A" of the tapered section 208 can be similar or correspond to the shape and thickness of the inner profile of the gap hider 234. The gap hider 234 can be flush with and fit into the tapered section 208 when the seat backrest 222 is folded such that the gap hider 234 and the outer surface 212 form a seamless extended load floor 402.

FIG. 3A illustrates an exemplary representation of configuring the spacer panel 200 with the backrest 222, in accordance with an embodiment of the present disclosure.

FIG. 4 illustrates an exemplary representation of configuring a load floor angle α achieved by the backrest 222 after incorporating the spacer panel 200, in accordance with an embodiment of the present disclosure.

As illustrated, in an embodiment, the thickness of the support structure 230 at the first portion 206 can be more than the thickness of the support structure 230 at the second end 204, and the thickness of the support structure 230 can decrease in a linear direction from the first portion 206 up to the second end 204. Further, the thickness of the support structure 230 can reduce, parabolically, from the first portion 206 to the first end 202 such that a curved profile 216 (also referred to as a guiding curve) is formed (near the first portion 206) followed by a flat tapered profile (formed at the first end 202) in the tapered section 208. A portion of the tapered section 208 can flush into the gap 236 between the gap hider 234 and the backrest 222 to provide support to the gap hider 234 when the backrest 222 is folded. Additionally, the curved profile 216 or guiding curve 216 at the first portion 206 helps avoid any obstruction between the gap hider 234 and a carpet 300 configured over the spacer panel 200. In one example, the gap hider 234 can also include carpet 300 such that an outer surface of the carpet 300 on the gap hider 234 aligns with an outer surface of the carpet 300 over the spacer panel 200 to provide the extended load floor area 402. Further, in an embodiment, the outer surface of the spacer panel 200 can include a set of trim channels adapted to secure one or more trim panels, associated with the interior of the vehicle, thereon.

In an implementation, the width of the support structure 230 can be equal to the width of the backrest 222 of a single-seat 220. The two rear seats 220 can be folded together when not in use and two separate spacer panels 200 can be positioned side by side over the two rear seats 220 to make the extended load floor 402, which comprises the outer surfaces 212 of the two spacer panels 200 and the load floor 400 of the vehicle, thereby increasing the loading area and achieving the load floor angle α. Further, the carpet 300 can also be configured over the two support structures 230 and the loading area such that no gap remains between the carpet 300 and the frame of the rear seats 220. The spacer panels 200 also provide support to the gap hider 234 and prevent the occurrence of any damage to the gap hider 234 and the seat 220 as well due to load.

Thus, the present disclosure provides a lightweight and cost-effective spacer panel 200 that can be induced in the rear seat backrest 222 for bringing the upper surface of the rear side of the backrest/carpet 300 and the upper surface of the load floor 400 of the vehicle in line and oriented in the same angle, once the rear seat is folded. The spacer panel 200 can be configured with the backrest 222 and can be further covered with the carpet 300 thereon for aesthetics. The spacer panel 200 can be of varying thicknesses such that it meets the extended load floor 402 formed after folding the seat 220 and remains seamless and in line with the load floor 400 of the vehicle. The curved profile in the spacer panel 200 helps avoid any obstructions to the gap hider 324 and the carpet 300. As a result, the spacer panel 200 allows more luggage or cargo to be put on the load floor area 400, 402 without any leveling issue between the gap hider 234 and the backrest 222. Also, as a portion of the support structure 230 can be flushed into the gap 236 between the gap hider 234 and the backrest 222, which provides support to the gap hider 234 once the seat 220 is folded. This support can provide enough strength to the gap hider 234 for bearing a load of an object or luggage without getting damaged.

Additionally, the use of a plastic honeycomb structure helps save material for manufacturing the spacer panel 200, thereby making the spacer panel 200 lightweight and cost-effective, and also allowing the spacer panel 200 to have a thickness between 2-15 mm (but not limited to the like), thereby meeting the load floor flatness, which is not possible or feasible with other materials and designs.

In interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various embodiments of the disclosed subject matter, other and further embodiments of the disclosure may be devised without departing from the basic scope thereof. The scope of the disclosure is determined by the claims that follow. The disclosure is not limited to the described embodiments, versions or examples, which are included to enable a person having ordinary skill in the art to make and use the disclosed subject matter when combined with information and knowledge available to the person having ordinary skill in the art.

The invention claimed is:

1. A spacer panel adapted to be configured with a rear side of a seat backrest of a vehicle, the spacer panel comprising:
a support structure having a first end and a second end, the support structure configured to be attached to a rear side of a backrest of a seat of the vehicle, wherein a thickness of the support structure varies along a length of the support structure from the first end to the second end of the support structure, such that when the seat is folded, an outer surface of the spacer panel and a floor of the vehicle are aligned with each other to form an extended load floor,
wherein the support structure includes a tapered section at a first portion adjacent to the first end of the support structure, and wherein the thickness of the support structure at the first portion is greater than the thickness of the support structure at the second end, and the thickness of the support structure linearly reduces from the first portion up to the second end.

2. The spacer panel according to claim 1, wherein when the seat is folded, the outer surface of the spacer panel and an upper surface of the floor of the vehicle are generally co-planar with each other and are oriented at a same angle to form the extended load floor.

3. The spacer panel according to claim 1, wherein the support structure has a honeycomb structure.

4. The spacer panel according to claim 1, wherein the spacer panel is made of plastic.

5. The spacer panel according to claim 1, wherein the first end of the support structure is associated with a pivotal end of the backrest of the seat.

6. The spacer panel according to claim 1, wherein the spacer panel is attached to the rear side of the backrest by an inner surface of the support structure.

7. The spacer panel according to claim 1, wherein the spacer panel comprises a set of engaging elements configured to facilitate attachment of the spacer panel to a frame of the backrest of the seat.

8. The spacer panel according to claim 1, wherein the thickness of the tapered section reduces from the first portion to the first end of the support structure.

9. The spacer panel according to claim 1, wherein the thickness of the tapered section reduces parabolically from the first portion towards the first end of the support structure such that a curved profile is formed at the first portion and a tapered flat profile is formed at the first end.

10. The spacer panel according to claim 1, wherein the spacer panel is configured with the rear side of the backrest of any, or a combination of, a rear seat, and a front seat of the vehicle.

11. An automotive seat comprising:
a seat cushion;
a backrest foldably coupled to the seat cushion; and
a spacer panel attached to the rear side of the backrest according to claim 1.

12. A spacer panel adapted to be configured with a rear side of a seat backrest of a vehicle, the spacer panel comprising:
a support structure having a first end and a second end, the support structure configured to be attached to a rear side of a backrest of a seat of the vehicle, wherein a thickness of the support structure varies along a length of the support structure from the first end to the second end of the support structure, such that when the seat is folded, an outer surface of the spacer panel and a floor of the vehicle are aligned with each other to form an extended load floor, wherein the outer surface of the spacer panel is adapted to attach a carpet thereon such that when the seat is folded, no gap is present between the backrest and the carpet.

13. The spacer panel according to claim 12, wherein when the seat is folded, the carpet and an outer surface of a gap hider associated with the seat are in line and oriented at a same angle.

14. The spacer panel according to claim 13, wherein when the seat is folded, an upper surface of the carpet and an upper surface of the floor of the vehicle comes in line and is oriented at the same angle forming the extended load floor.

15. The spacer panel according to claim 13, wherein a portion of the spacer panel has a curved profile forming a guiding curve between the first portion and the tapered section, which restricts obstruction between the gap hider and the carpet.

16. The spacer panel according to claim 13, wherein the tapered section is configured with the gap hider such that a guide is provided to open and close the gap hider.

17. The spacer panel according to claim 13, wherein at least a portion of the tapered section is flush with and fits inside a gap between the gap hider and the backrest to provide support to the gap hider.

18. The spacer panel according to claim 13, wherein a profile of the tapered section corresponds to an inner profile of the gap hider.

\* \* \* \* \*